United States Patent [19]

Harmon

[11] 4,407,435

[45] Oct. 4, 1983

[54] DISPENSER FOR POURING MEASURED QUANTITIES OF A LIQUID FROM A CONTAINER

[76] Inventor: James V. Harmon, 56 Pine St., Mahtomedi, Minn. 55115

[21] Appl. No.: 341,315

[22] Filed: Jan. 21, 1982

[51] Int. Cl.³ .............................................. G01F 13/00
[52] U.S. Cl. ................................... 222/481; 137/512.2
[58] Field of Search .............. 222/456, 425, 439, 479, 222/481, 212, 166; 251/210; 137/512.1, 512.2

[56] References Cited

U.S. PATENT DOCUMENTS

| | | |
|---|---|---|
| 252,519 | 1/1882 | Righter et al. . |
| 788,118 | 4/1905 | Perotti . |
| 1,654,810 | 1/1928 | Hillyard . |
| 2,368,540 | 1/1945 | Goodman . |
| 2,968,423 | 1/1961 | Mahler et al. . |
| 3,070,266 | 12/1962 | Chappell . |
| 3,129,859 | 4/1964 | Chappell . |
| 3,156,386 | 11/1964 | Kuechenmeister . |
| 3,233,797 | 2/1966 | Conry . |
| 3,519,171 | 7/1970 | Kinnavy . |
| 3,543,964 | 12/1970 | Schlossmacher . |

FOREIGN PATENT DOCUMENTS 1133650  7/1962  Fed. Rep. of Germany .

Primary Examiner—Stanley H. Tollberg

[57] ABSTRACT

A dispenser is described for pouring liquids from a container such as a liquor bottle. It includes a discharge passage having an outlet nozzle at one end and a dual purpose valve element slideably and sealably mounted within the passage. The valve element includes a duct through it that extends between opposite sides of the passage. A movable sealing body, e.g. a ball in the duct is adapted to move under the influence of gravity to a first position for sealing the duct when the dispenser is inverted. The sealing body moves under the influence of gravity from its sealing position to an open position when the dispenser is upright allowing the valve element to slide quickly to its starting position at the end of the passage.

7 Claims, 5 Drawing Figures

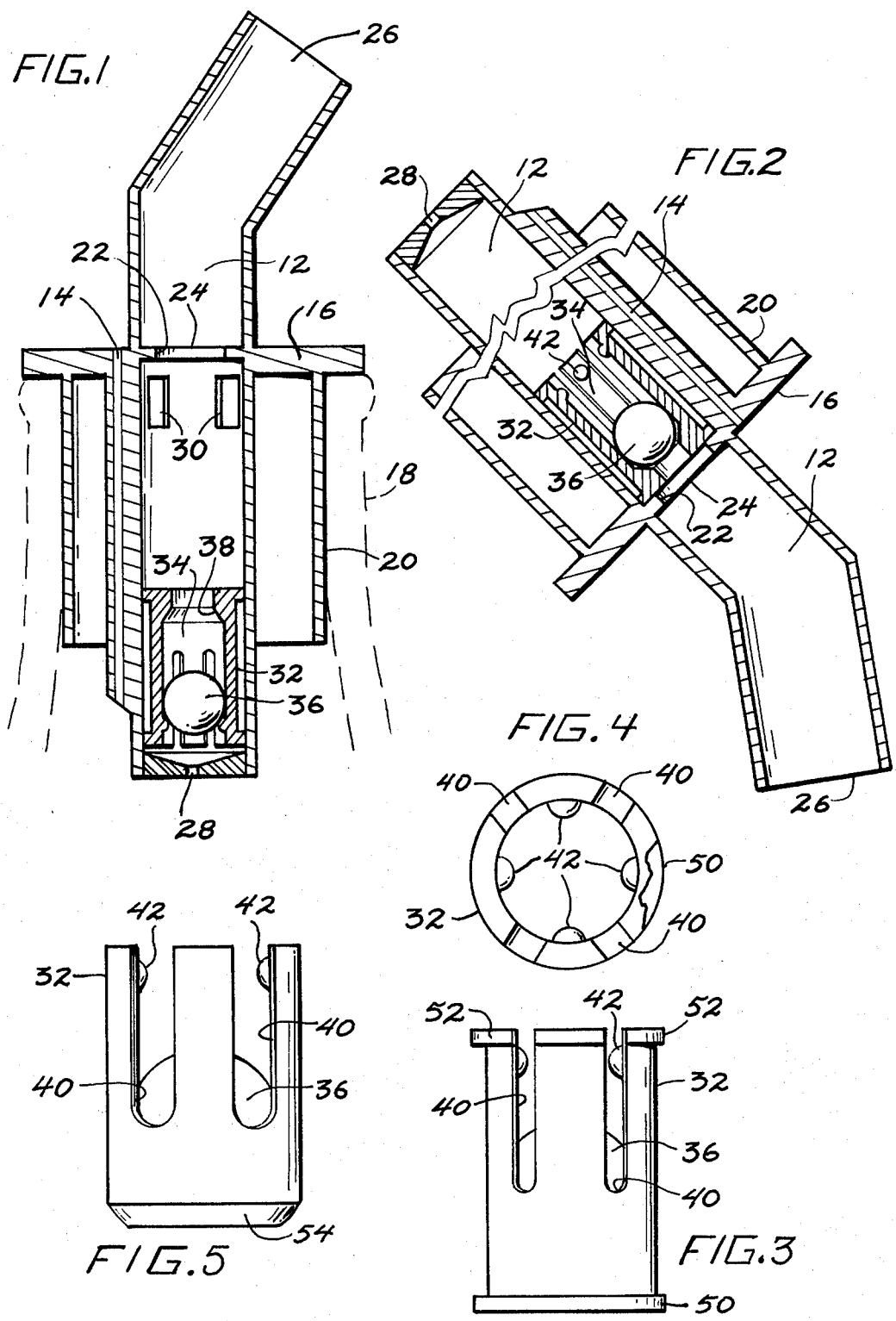

4,407,435

DISPENSER FOR POURING MEASURED QUANTITIES OF A LIQUID FROM A CONTAINER

FIELD OF THE INVENTION

This invention relates to the dispensing of liquids from a container such as a bottle and particularly to a pouring nozzle that dispenses a measured quantity of liquid.

THE PRIOR ART

Many dispensers have been provided for pouring liquid from bottles. For example, U.S. Pat. No. 3,321,113 describes a pourer using two check balls for discharging measured quantities of liquid. While generally acceptable, the two check balls which are usually made of stainless steel are a substantial part of the raw material costs. Assuming the check balls and the resin costs are about equal, the elimination of one of the balls will reduce raw material costs by about 25%. Moreover, the two separate ball check valves described in the patent also add design complexity that can increase tooling costs, complicate manufacturing operations and assembly work. Complexity can also increase the likelihood for malfunction during quality control chects resulting in greater numbers of rejects. In the patented dispenser, a small liquid control opening about 1/16" in diameter is provided on the side of the discharge tube. In that position, dissolved solids present in certain liquids can accumulate in the control opening, reducing its size thereby causing decreased volumes of liquid to be dispensed as the control opening slowly becomes plugged over time.

SUMMARY OF THE INVENTION

To overcome these and other defects of the prior art, the present invention comprises a dispenser for pouring measured quantities of liquid from a container and includes a liquid discharge passage and an air vent passage adapted to be sealed in the mouth of the container. The discharge passage has an outlet nozzle at its upper end and a liquid control orifice toward its lower end as well as a liquid inlet opening between the nozzle and the orifice. A dual purpose valve element is slideably and sealably mounted within the passage. The valve element has a duct therein communicating between opposite sides of the passage. A movable sealing body, e.g. a ball located in the duct is adapted to move between a first position for sealing the duct when the dispenser is inverted and a second open position under the influence of gravity when the dispenser is turned upright allowing the valve element to fall quickly for the start of another pouring operation.

THE FIGURES

FIG. 1 is a vertical crossectional view of the dispenser mounted in the neck of a bottle with the bottle in an upright position.

FIG. 2 is a similar view showing the dispenser as it appears after a measured quantity of liquid has been dispensed and the flow has been cut off.

FIG. 3 is a side elevational view of the valve element.

FIG. 4 is a crossectional view of the valve element taken on line 4—4 of FIG. 3 and FIG. 5 is a side elevational view of another form of valve element.

DETAILED DESCRIPTION

Refer now to the figures and particularly FIGS. 1 and 2. As shown in FIG. 1, a removable pouring dispenser is indicated generally by the numeral 10. The dispenser 10 includes a liquid discharge passage 12 and an air vent passage 14 as well as a flange 16 adapted to rest on the mouth of bottle 18 during use. A flexible sealing collar or cork 20 as it is sometimes called extends downwardly from the flange 16 and is adapted to seal tightly against the inside wall of the bottle. The sealing collar 20 can have any desired shape known to the prior art and may contain longitudinally spaced parallel sealing rings (not shown). Thus, the dispenser 10 which may be formed from injection molded plastic resin is inserted removably into the neck of bottle 18 with the collar 20 sealing the bottle and at the same time holding the dispenser in the operating position shown in FIG. 1. The discharge passage 12 contains a seat or stop 22 with a central opening 24 for purposes to be described later. The lower end of the discharge passage 12 opposite outlet nozzle 26 includes a liquid control orifice 28 of predetermined size for regulating the amount of liquid discharged. The lower end of the discharge passage 12 is otherwise closed. Between the outlet nozzle 26 and the orifice 28 are one or more liquid inlet openings 30. The openings 30 are fairly large in size and allow the liquid to flow from the interior of the bottle 18 out through nozzle 26 during the dispensing operation. The inlet openings 30, two of which are shown, are positioned between the outlet nozzle and the orifice at a location where they will communicate with the interior of the bottle to facilitate the flow of liquid from the bottle.

Within the liquid discharge passage 12 is slideably and sealably mounted a valve element 32. The valve element 32 includes a duct 34 that extends therethrough from one side of the passage 12 to the other. Mounted within the duct is a movable sealing body 36, e.g. a stainless steel ball adapted to move to a first position on a seat 38 for sealing the duct 34 when the dispenser is inverted with the nozzle 26 pointed downwardly so that the valve element 32 thereby moves at a predetermined speed toward the inlet openings 30 under the influence of liquid flowing in through the control orifice 28 while liquid flows through openings 30 out through the dispensing nozzle 26. Finally, the valve element seals the inlet openings and shuts off the liquid flow after the measured quantity of liquid has been dispensed. At this point, the bottle and dispensing nozzle is tipped upright and sealing body 36 falls to a second open position allowing the sealing body to fall quickly toward the lower end of the dispensing passage 12 ready for the start of another pouring operation. It will be seen that the sealing body 36 is able to move easily up and down within the valve element 32 and is caged therein at all times, longitudinally extending slots 40 allowing liquid to flow around the sealing body or ball 36 when off of the seat 38. Projections 42 can be used to hold the ball within the valve element. Once the valve element 32 has traveled toward the outlet nozzle 26 past the inlet openings 30, the flow therethrough will necessarily be shut off but the best seal can be provided by the provision of a circular seat 22. However, since most of the flow has been stopped by the valve element 32 passing the inlet openings 30, the part 22 need not necessarily be a circular valve seat but only a means to stop the movement of the valve element 32 such as a projection from the wall of the discharge passage 12. The valve element 32 should have enough clearance within the passage 12 to slide easily but the clearance should be small enough so that there is minimal leakage of liquid around it, i.e. it is sealably mounted therein. A clearance of about 0.001" to 0.002" is usually satisfactory.

Valve element 32 is preferably provided with a sealing flange 50 (FIG. 3) just slightly smaller than the internal diameter of the passage 12 to minimize drag so that it will slide easily but yet virtually seal the passage. Exterior radial projections 52 at the opposite end of the sealing element provide the same overall outside diameter as flange 50 preventing element 32 from becoming cocked or tipped within the passage 12.

A modified form of sealing element 32 is shown in FIG. 5. No sealing flange 50 is provided. Instead, the diameter is uniform throughout the length of the sealing element 32. At the lower end of the sealing element is provided a sealing surface 54 which is preferably spherical in shape. A spherical shaped sealing surface 54 will contact the seat 22 and will always form a perfect seal even though the valve element is tipped somewhat within the passage 12 since any crossection through a spherical surface is circular.

During operation, the sealing element 32 will be at the lower end of the discharge passage 12 ready to start its cycle when the bottle is upright. When tipped, liquid will begin streaming through the inlet openings 30 then out through the nozzle 26 and with the ball 36 sealing duct 34, the valve element 32 will travel at a relatively slow speed controlled by the size of the liquid control orifice 28 in the direction of the openings 30, the suction created behind the moving valve element drawing fluid in through the orifice 28. Finally, when the valve element passes the liquid inlet openings 30 and seals the seat 22, the flow of liquid from the bottle will be shut off. The bottle, together with the nozzle 10, is then turned upright whereupon the sealing body or ball 36 will drop to the open position shown in FIG. 1 thereby allowing the sealing element 32 to fall quickly to the bottom of the discharge tube 12 ready for the start of another pouring cycle. It will be seen that the liquid in the dispensing nozzle flows relatively slowly out through the liquid control orifice 28 but since the control orifice 28 is at the end of the dispensing passage rather than on its side, it will tend to plug up less since it is in a better position to drain. It will also be noted that the sealing body 36 has a dual function since it allows the valve element to drop quickly as well as together with the valve element 32 shutting off the flow of liquid through the inlet openings 30. It will also be seen that operation is accomplished with the use of only one ball and that construction is simplified through the elimination of parts. This can reduce tooling costs as well as simplifying manufacturing and assembly work and increasing reliability.

It will also be seen that flange 50 will limit contact between the sealing element 32 and the wall of passage 12 reducing friction and drag. The projections 52 keep the valve element 32 in alignment with the axis of passage 12. The passage 12 and element 32 are both preferably cylindrical and both can be formed from injection molded plastic resin. The sealing body 36 is preferably a stainless steel ball. Since the axis of orifice 28 is vertical when the dispenser is upright, it will drain readily and not tend to become plugged.

The invention has been described by way of example and many variations within the scope of the appended claims will be apparent to those skilled in the art once the principles of the invention are understood.

What is claimed is:

1. A dispenser for pouring measured quantities of a liquid from a container comprising a liquid discharge passage and an air vent passage extending when the dispenser is in use from the exterior of the container to the interior thereof, a sealing collar around the passages for mounting the dispenser in the container, at its upper end and a liquid control orifice toward the lower end thereof and a liquid inlet opening located between the nozzle and the orifice, said inlet opening communicating when the dispenser is in use with the interior of the container, a valve element sealably and slideably engaged within the discharge passage, a duct in the valve element communicating therethrough between opposite sides of the discharge passage and a sealing body within the duct movable therein between a first position for sealing the duct when the dispenser is inverted so that the nozzle points downwardly, the valve element thereby moving at a predetermined speed toward the inlet opening under the influence of the liquid flowing into the passage through the control orifice while liquid within the container flows through the liquid inlet opening and out through the dispensing nozzle and said valve element then sealing the inlet opening and shutting off the liquid flow after a measured quantity of liquid has been dispensed, whereupon when the container and dispenser are tipped back to an upright position, the sealing body will fall under the influence of gravity to a second open position in the sealing element when the dispenser is upright allowing the sealing element to fall quickly toward the lower end of the passage ready for the start of another pouring operation.

2. The dispenser of claim 1 wherein a sealing flange encircles said valve element to limit contact between the valve element and the walls of the passage thereby reducing friction and drag.

3. The combination of claim 2 wherein exterior radial projections are provided on the exterior surface of the valve element in spaced relationship from said flange to maintain said valve element in alignment with the central axis of the passage.

4. The dispenser of claim 1 wherein a spherical sealing surface is provided on one end of the valve element facing the upper end of said dispensing passage, a circular valve seat is provided in the liquid discharge passage between the inlet opening and the outlet nozzle and the spherical sealing surface is adapted to seal against the circular seat.

5. The dispenser of claim 1 wherein the liquid discharge passage is circular, said sealing element is a cylinder of a size adapted to slide within and substantially seal the circular discharge passage.

6. The pouring dispenser of claim 1 wherein the movable sealing body within the valve element comprises a metal ball and said valve element has an internal circular valve seat at the end thereof closest to the outlet nozzle adapted to be sealed by the ball when the nozzle is tilted downwardly to the pouring position.

7. The pouring dispenser of claim 1 wherein the liquid control orifice is positioned at the lower end of the liquid discharge passage with its axis positioned vertically when the dispenser is upright whereby liquid will drain readily from the orifice without becoming trapped therein.

* * * * *